US008794258B2

(12) United States Patent
Galasso

(10) Patent No.: US 8,794,258 B2
(45) Date of Patent: Aug. 5, 2014

(54) PRESSURE HARMONIZER

(76) Inventor: Andrew Galasso, Islip, NY (US)

(*) Notice: Subject to any disclaimer, the term of this patent is extended or adjusted under 35 U.S.C. 154(b) by 121 days.

(21) Appl. No.: 13/253,914

(22) Filed: Oct. 5, 2011

(65) Prior Publication Data
US 2013/0087224 A1 Apr. 11, 2013

(51) Int. Cl.
F16K 15/20 (2006.01)
B60C 23/10 (2006.01)

(52) U.S. Cl.
USPC .............. 137/223; 137/576; 141/38; 152/415

(58) Field of Classification Search
USPC .............................. 137/223, 574, 576; 141/38; 152/415–416
See application file for complete search history.

(56) References Cited

U.S. PATENT DOCUMENTS

| 1,801,716 | A | * | 4/1931 | Bowers | 152/417 |
|---|---|---|---|---|---|
| 2,090,089 | A | * | 8/1937 | Wiegand | 152/417 |
| 2,168,690 | A | * | 8/1939 | Uksila | 152/416 |
| 3,099,309 | A | * | 7/1963 | Congost Horta et al. | 152/416 |
| 4,037,638 | A | | 7/1977 | Mosca | |
| 4,387,931 | A | * | 6/1983 | Bland | 303/1 |
| 4,658,869 | A | * | 4/1987 | Soon-Fu | 141/98 |
| 4,782,878 | A | * | 11/1988 | Mittal | 152/417 |
| 4,938,453 | A | * | 7/1990 | Blanchard | 251/313 |
| 4,969,493 | A | * | 11/1990 | Lee | 141/38 |
| 5,158,122 | A | | 10/1992 | Moffett | |
| 5,307,846 | A | | 5/1994 | Heinemann | |
| 5,327,925 | A | * | 7/1994 | Ortel | 137/15.08 |
| D361,950 | S | | 9/1995 | Mascio | |
| 5,611,875 | A | | 3/1997 | Bachhuber | |
| 5,629,874 | A | * | 5/1997 | Mittal | 702/140 |
| 5,884,659 | A | * | 3/1999 | Prosser et al. | 137/587 |
| 5,891,277 | A | | 4/1999 | Bachhuber | |
| 6,286,565 | B1 | | 9/2001 | Pike | |
| 6,581,620 | B2 | * | 6/2003 | Babcock et al. | 137/15.15 |
| 6,941,989 | B2 | * | 9/2005 | Grotendorst et al. | 152/415 |
| 7,530,379 | B1 | * | 5/2009 | Becker et al. | 152/415 |
| 7,882,731 | B1 | | 2/2011 | Franks et al. | |
| 2002/0108671 | A1 | | 8/2002 | Campbell et al. | |
| 2002/0121323 | A1 | * | 9/2002 | Tarasinski | 152/416 |
| 2003/0121562 | A1 | | 7/2003 | Feng | |
| 2003/0164759 | A1 | | 9/2003 | Nantz et al. | |
| 2004/0226617 | A1 | * | 11/2004 | Arentsen et al. | 137/614.2 |
| 2006/0180256 | A1 | * | 8/2006 | Mittal | 152/416 |

* cited by examiner

Primary Examiner — John Rivell
Assistant Examiner — David Colon Morales
(74) Attorney, Agent, or Firm — James J. Lillie; Lillie Law, LLC

(57) ABSTRACT

An air pressure harmonizing system comprising: a central chamber hub, the hub having a longitudinally hollow body with a first and second end; a gauge means, positioned between the first and second ends extending radially outwardly from the body; an inlet port means, positioned between the first and second ends extending radially outwardly from the body, wherein the inlet port being configured and dimensioned to receive a standard sized air chuck; an outlet port means, positioned between the first and second ends extending radially outwardly from the body, the means being configured and dimensioned to selectively discharge surplus air to desired target pressure; and a plurality of air exchange ports extending radially outwardly from the chamber, wherein each air exchange port has a flexible conduit connected thereto, each conduit having a proximal and distal end, wherein an air chuck is cooperatively connected to the distal end of the conduit.

13 Claims, 6 Drawing Sheets

PRESSURE HARMONIZER

BACKGROUND OF THE INVENTION

This invention relates to a pressure harmonizer, in particular, an improved pressure harmonizer that provides, inter alia, a system to inflate and deflate a plurality of tires to a desired target pressure simultaneously yielding an equal pressure therein.

Historically, when an operator of a motor vehicle needs to adjust the air pressure in the tires, each tire must be adjusted one at a time. For example, when the operator desires to drive their vehicle onto a beach, the operator needs to stop, and exit the vehicle, and let air out of each tire individually, one at a time to the desired pressure, often starting from about 28 to 35 PSI per tire down to about 15 PSI per tire, which is time consuming, and often annoying. Likewise, when after the operator fulfills their fun at the beach, whether it is for fishing, surfing, tanning, etc., the operator must now reverse the procedure, namely, exit the vehicle, and attach an air hose to each tire, inflate from the current 15 PSI, up to the desired target pressure of typically about 28 to 35 PSI, and then repeat the process one tire at a time. After a long day at the beach, this is probably one of the last things an operator wants to do, hence the need to minimize or eliminate this process altogether.

SUMMARY OF THE INVENTION

The present invention is directed to a pressure harmonizer amongst a plurality of tires.

An objective of the present invention is to improve reliability of performance, namely, pressure harmonization of the tires.

Another objective of the present invention includes extended useful life of the tires via pressure harmonization.

A further objective of the present invention includes improved ergonometrics and ease of use.

A still further objective of the present invention includes increasing safety of driving by pressure harmonization between the tires.

An additional objective of the present invention includes increased fuel efficiency via pressure harmonization of the tires, by increasing efficiency of airing down and airing up the tires.

Other objectives, advantages, and novel features of the present invention will become more apparent from the following detailed description when taken in conjunction with the accompanying drawings.

BRIEF DESCRIPTION OF THE DRAWINGS

The following drawings, in which like reference characters indicate like parts, are provided for illustration of the invention and are not intended to limit the invention in any manner whatsoever.

DETAILED DESCRIPTION OF THE INVENTION

The following descriptions of the preferred embodiments are presented to illustrate the present invention and are not to be construed to limit the claims in any manner whatsoever. In reference to the drawings, namely FIGS. 1 to 3B, the following embodiments are shown.

Figure 1:
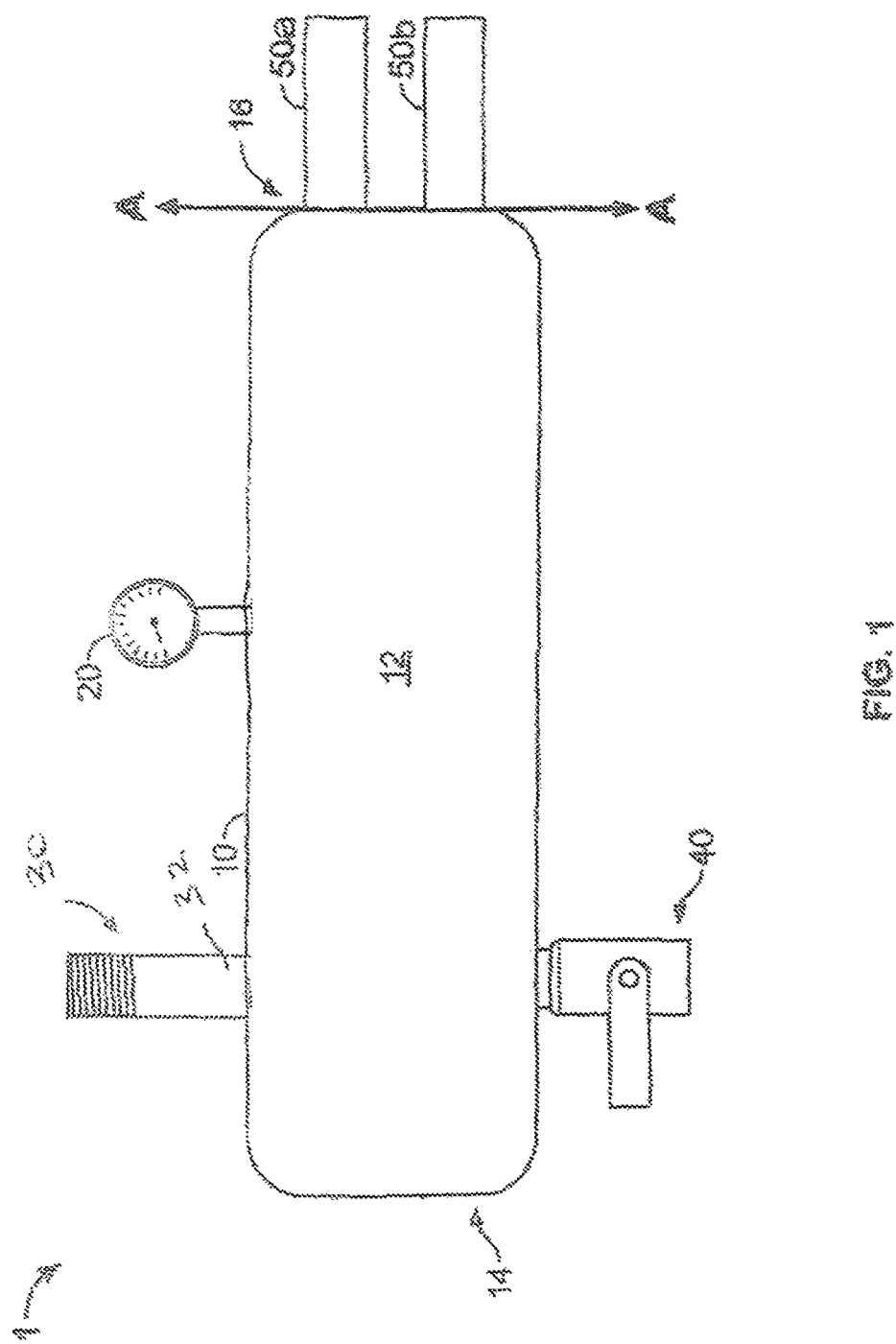
FIG. 1 illustrates a front view of the preferred embodiment.
Figure 2:
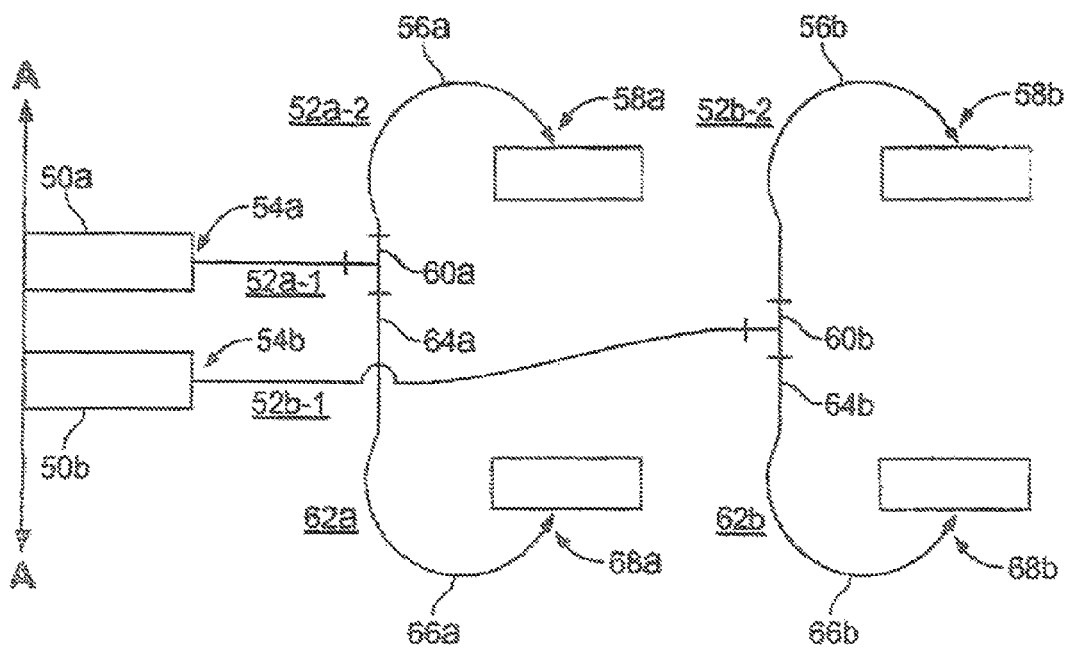
FIG. 2 illustrates a side view of the preferred embodiment.
Figure 3:
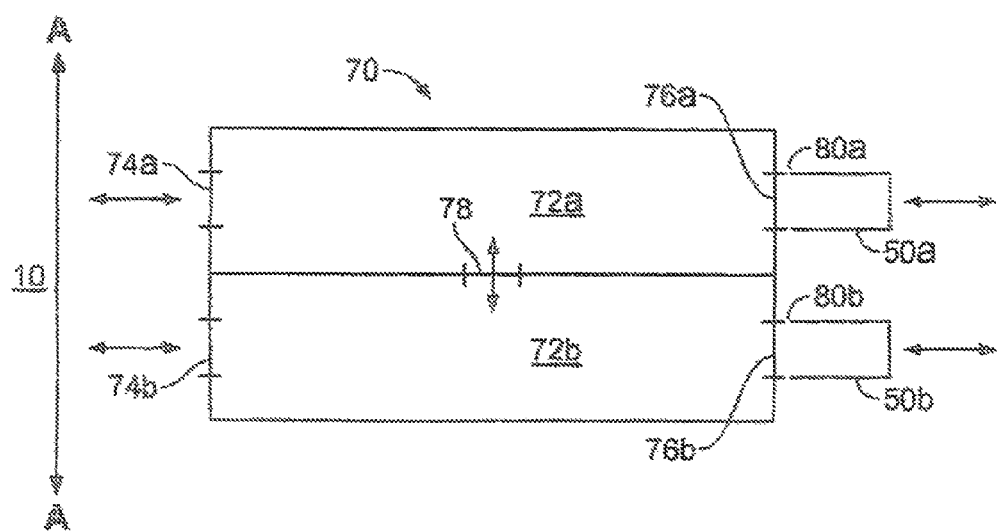
FIG. 3 illustrates a front view of the controlling means
Figure 1A:
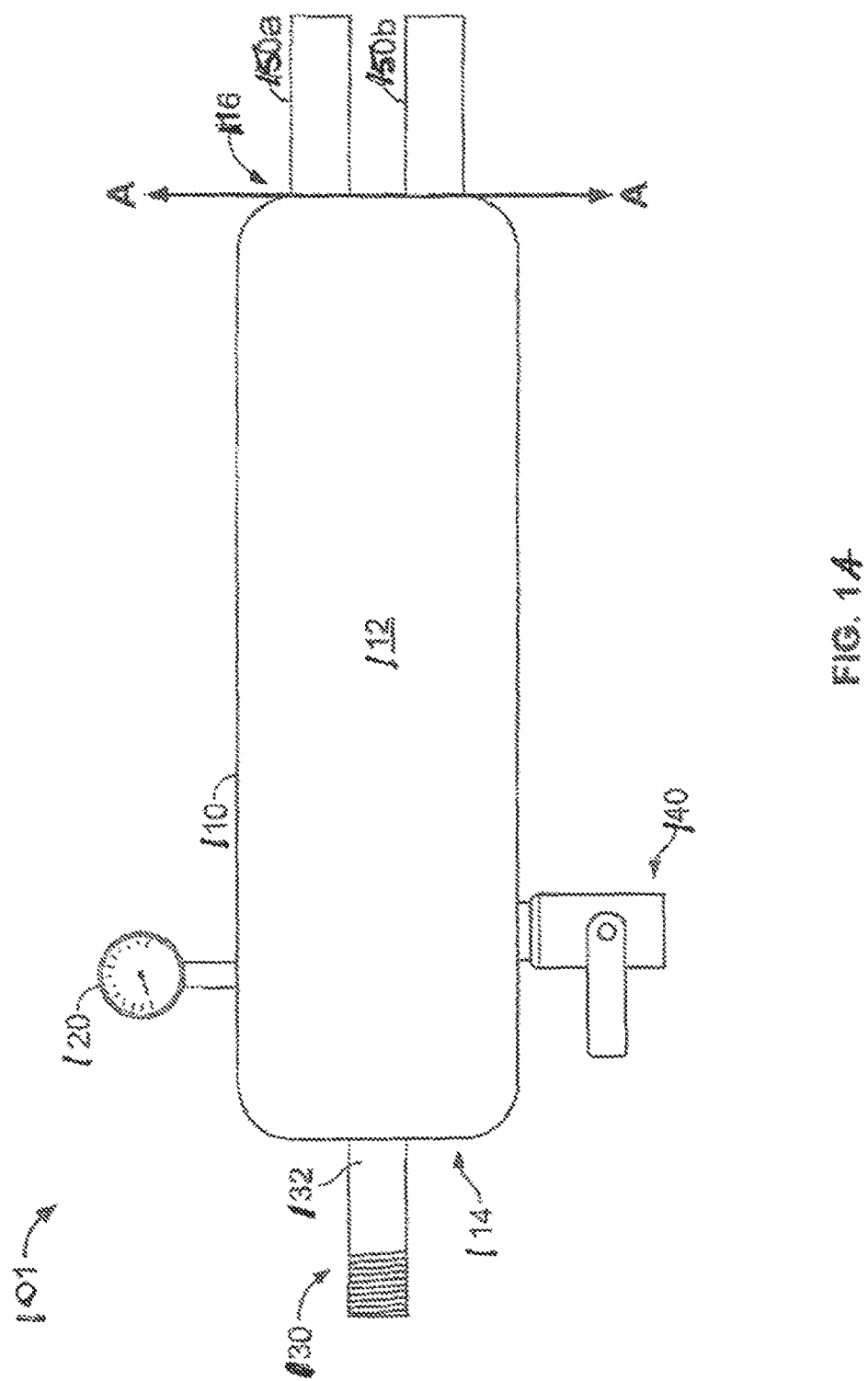
FIG. 1A illustrates a front view of an alternative embodiment.
Figure 2A:
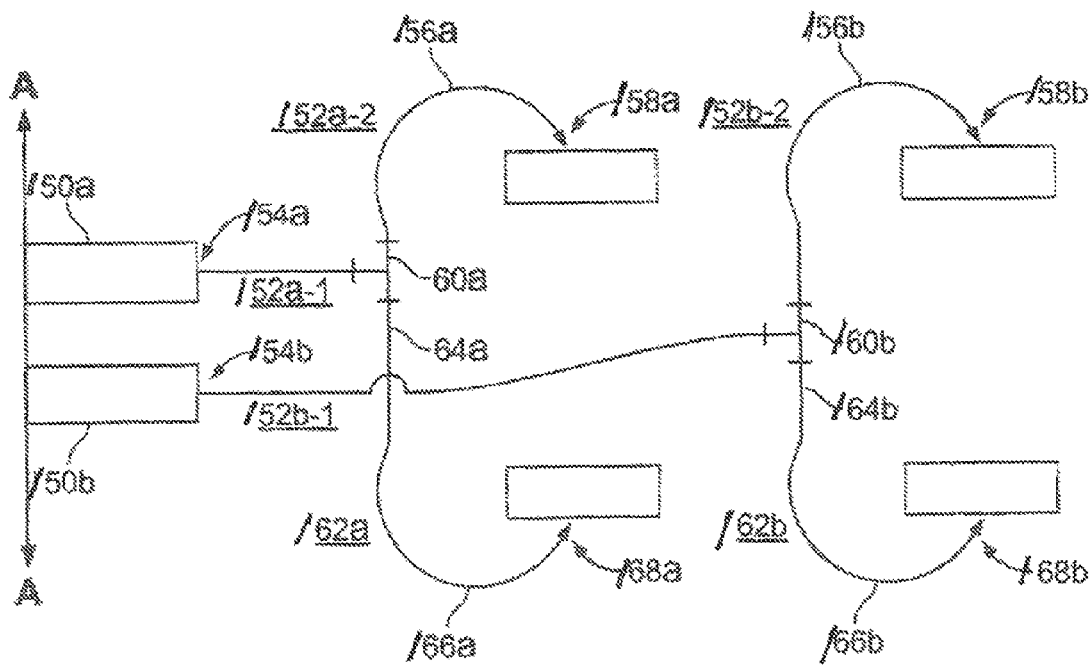
FIG. 2A illustrates a side view of FIG. 1A.

FIGS. 1 to 3 illustrate a preferred embodiment of the present invention is disclosed, which is directed to an air pressure harmonizing system 1. In a preferred embodiment, the system 1 has a central manifold 10 having a longitudinally hollow body 12 with a first and second end 14,16, wherein said manifold 10 is made from a material that is corrosion resistant and/or rust resistant, for example, the material used may incorporate plastic, PVC, and/or stainless steel or the like.

The system 1 includes a gauge means 20, positioned between said first and second ends 14,16 extending radially outwardly from said body 12. The gauge means 20 may be an analog, digital, or combination of analog and digital type, wherein an analog type is illustrated in the drawings.

The system 1 further includes an inlet port means 30, positioned between said first and second ends 14,16 extending radially outwardly from said body 12, wherein said inlet port 30 is configured and dimensioned to removeably receive a standard sized air chuck via a single air source. The inlet port 30 is longitudinally shaped with an outer wall 32, wherein said outer wall 32 is threaded.

The system 1 further includes an outlet port means 40, positioned between said first and second ends 14,16 extending radially outwardly from said body 12, said means 40 being configured and dimensioned to selectively discharge surplus air to a desired target pressure determined by the operator thereof. The outlet port means 40 comprises a ball valve, although it is envisioned that other types of stop cocks or pressure relief valves can be substituted.

The system 1 still further includes a plurality of air exchange ports 50a,b extending axially outwardly from said chamber 10, wherein each air exchange port 50a,b has a flexible conduit 52a,b connected thereto, each conduit 52a,b having a proximal and distal end 54a,b, 56a,b, wherein a connecting means 58a,b is cooperatively connected to said distal end 56a,b of said conduit 52a,b for releaseably connecting to an air valve on the targeted tire. Each air exchange port 50a,b extends axially outwardly, however, it is envisioned that they 50a,b may be either parallel or not depending on the shape of the body 10 and design choice.

Each conduit 52a,b is bifurcated into a first and second length 52a-1, 52a-2 and 52b-1, 52b-2, wherein a diverging fitting 60a,b, such as a t-fitting or y-fitting, is inserted therebetween and wherein a second conduit 62a,b, having a proximal and distal end 64a,b and 66a,b, is cooperatively connected to said fitting 60a,b via the proximal end thereof 64a,b, and said distal end 66a,b having a connecting means 68a,b cooperatively connected thereto for releaseably connecting to an air valve on a targeted tire (not shown). For example, an air chuck, or some other device that attaches to the air valve and remains thereon hands free during the pressure adjustment process, once the process is completed, the device can be removed quite easily.

Each conduit 52a,b and 62a,b is made from a material that is corrosion resistant, such as rubber, and/or plastic but should be able to withstand air pressure of about two-hundred pounds per square inch (200 PSI), or about one-hundred pounds per square in (100 PSI), but no less than about fifty pounds per square inch (50 PSI), as it is envisioned this system can be used on a bicycle, motorcycle, tricycle, quadracycle, an ATV (whether three, four, or six-wheeled), a golf-cart, and/or motor-vehicle having a plurality of tires. Furthermore, each conduit 52a,b and 62a,b is made from a material that has at least about one-quarter inch inside diameter ID, although larger diameters may be incorporated depending on the specifications of the pump such as its CFM and PSI ratings.

Each connecting means 58a,b and 68a,b is normally closed when not engaged/deployed, and open when engaged/deployed with a valve of the wheel of the desired/target vehicle, thereby permitting the operator to operate the connecting means 58a,b and 68a,b hands free and attend to the system 1 while in use.

In order to illustrate the device in use, the following is an example of deployment thereof on a four wheeled drive vehicle having a tire size of 30×9/50 R 15 LT, using a portable air compressor having the following specifications, 12 volts, max amps 45, max pressure of 140 PSI, and a flow rate of 3.71 CFM @ 90 PSI.

The time to connect all four connecting means 58a,b, and 68a,b to the valves of the vehicle took 90 seconds, and once connected, the time to deflate the tires took only 176 seconds (aka 2 minutes, and 54 seconds), whereas if the operator performed the same task individually deflating the tires, the time to deflate, and check the pressure of the four tires collectively took a whopping 390 seconds (aka 6 minutes and 30 seconds), a time savings of 55.38 percent.

As to exiting the beach, the setup time again took 90 seconds with the above compressor and specifications thereof, and the time to inflate using the invention 1 took 466 seconds (aka 7 minutes, 46 seconds), whereas if the operator performed the same task individually inflating the tires, the time to inflate, and check the pressure of the four tires collectively took 633 seconds (aka 10 minutes and 33 seconds), a time savings of 30.45 percent.

It should be noted that in these illustrations, namely, FIGS. 1 to 3, each conduit has an inner diameter of about one-quarter inch, and the length of the conduit 52a,b from the manifold 10 to the diverging fitting 60a,b was about 8.5 feet, and to the first connecting means 58a,b about one foot, and then from the diverging fitting 60a,b to the connecting means 68a,b about 10 feet, wherein the lengths and specifications of the conduits 52a,b, 62a,b, were symmetrical on both sides of the vehicle.

It is envisioned that the device 1 may be asymmetrical, such as is the scenario when being used on a vehicle that has more tires on rear, then on the front, such as a dually (aka big dually) which has two tires on the front, and four tires on the rear.

FIG. 3 illustrates an optional controlling means 70 which is included for regulating the air pressure at the air exchange ports 50a,b. The controlling means 70 comprises a bifurcated chamber 72a,b between the manifold 10 and the air exchange ports 50a,b, said chamber 72a,b having a first opening 74a,b on the proximal end, a second opening 76a,b on its distal end, and a third opening 78 between the first and second sub-chambers 72a,b.

The first opening 74a,b is connected to the distal end 16 of the manifold 10 permitting air to enter each sub-chamber 72a,b.

The second opening 74a,b is located on the distal end of each sub-chamber 72a,b, connecting the sub-chamber 72a,b with an air exchange port 50a,b, permitting air to egress, with the conduit 52a,b and the connecting means 58a,b and 68a,b.

The third opening 78 between the two sub-chambers 72a,b provides harmonization of the pressures at the air exchange ports 50a,b, and ultimately the connecting means 58a,b and targeted tires.

Each opening 74a,b, 76a,b, and 78 has a gate that opens and closes which is operated by a controller 80.

The controller 80a on the first port 50a includes at least one set point, preferably two, namely a high and low. The low set point is used when the tire is deflated; the high set point when the tire is inflated.

The controller 80b on the second port 50b includes at least one set point, preferably at least two, a high and a low, and optionally, a sync mode. The low set point is used when the tire is deflated, the high set point when the tire is inflated; and the sync mode when the targeted deflation/inflation set points on the second port 50b are the same as the desired set point on the first port 50a. The sync mode set point enables the user to harmonize the pressure on both ports 50a,b, which typically one port 50a is used for the front tires, and the other port 50b for the rear tires. Driving the vehicle with deflated tires typically requires all the tires having identical pressure of 10 to 15 PSI for the beach, which on road/pavement, some vehicles require a different pressure for the front as compared to the rear, although some operators ignore this and put the same pressure in all the tires regardless whether on or off road. This system 1 provides the best of both worlds, namely, the specification of the vehicle as recommended by the manufacturer but also the operator's personal use for comfort and handling.

FIGS. 1A to 3A illustrate a preferred embodiment of the present invention disclosing an air pressure harmonizing system 101. The system 101 has a central manifold 110 having a longitudinally hollow body 112 with a first and second end 114,116, wherein said manifold 110 is made from a material that is corrosion resistant and/or rust resistant, for example, the material used may incorporate plastic, PVC, and/or stainless steel or the like.

The system 101 includes a gauge means 120, positioned between said first and second ends 114,116 extending radially outwardly from said body 112. The gauge means 120 may be an analog, digital, or combination of analog and digital type, wherein an analog type is illustrated in the drawings.

The system 101 further includes an inlet port means 130, positioned near said first end 114 extending axially outwardly from said body 112, wherein said inlet port 130 is configured and dimensioned to removeably receive a standard sized air chuck via a single air source. The inlet port 130 is longitudinally shaped with an outer wall 132, wherein said outer wall 132 is threaded.

The system 101 further includes an outlet port means 140, positioned between said first and second ends 114,116 extending radially outwardly from said body 112, said means 140 being configured and dimensioned to selectively discharge surplus air to a desired target pressure determined by the operator thereof. The outlet port means 140 comprises a ball valve, although it is envisioned that other types of stop cocks or pressure relief valves can be substituted.

The system 101 still further includes a plurality of air exchange ports 150a,b extending axially outwardly from said chamber 110, wherein each air exchange port 150a,b has a flexible conduit 152a,b connected thereto, each conduit 152a,b having a proximal and distal end 154a,b, 56a,b, wherein a connecting means 158a,b is cooperatively connected to said distal end 156a,b of said conduit 152a,b for releaseably connecting to an air valve on the targeted tire. Each air exchange port 150a,b extends axially outwardly, however, it is envisioned that they 150a,b may be either parallel or not depending on the shape of the body 110 and design choice.

Each conduit 152a,b is bifurcated into a first and second length 152a-1, 152a-2 and 152b-1, 152b-2, wherein a diverging fitting 160a,b, such as a t-fitting or y-fitting, is inserted therebetween and wherein a second conduit 162a,b, having a proximal and distal end 164a,b and 166a,b, is cooperatively connected to said fitting 160a,b via the proximal end thereof 164a,b, and said distal end 166a,b having a connecting means 168a,b cooperatively connected thereto for releaseably connecting to an air valve on a targeted tire (not shown). For example, an air chuck, or some other device that attaches to the air valve and remains thereon hands free during the pressure adjustment process, once the process is completed, the device can be removed quite easily.

Each conduit 152a,b and 162a,b is made from a material that is corrosion resistant, such as rubber, and/or plastic but should be able to withstand air pressure of about two-hundred pounds per square inch (200 PSI), or about one-hundred pounds per square in (100 PSI), but no less than about fifty pounds per square inch (50 PSI), as it is envisioned this system can be used on a bicycle, motorcycle, tricycle, quad-racycle, an ATV (whether three, four, or six-wheeled), a golf-cart, and/or motor-vehicle having a plurality of tires. Furthermore, each conduit 152a,b and 162a,b is made from a material that has at least about one-quarter inch inside diameter ID, although larger diameters may be incorporated depending on the specifications of the pump such as its CFM and PSI ratings.

Each connecting means 158a,b and 168a,b is normally closed when not engaged/deployed, and open when engaged/deployed with a valve of the wheel of the desired/target vehicle, thereby permitting the operator to operate the connecting means 158a,b and 168a,b hands free and attend to the system 101 while in use.

In order to illustrate the device in use, the following is an example of deployment thereof on a four wheeled drive vehicle having a tire size of 30×9/50 R 15 LT, using a portable air compressor having the following specifications, 12 volts, max amps 45, max pressure of 140 PSI, and a flow rate of 3.71 CFM @ 90 PSI.

The time to connect all four connecting means 158a,b, and 168a,b to the valves of the vehicle took 90 seconds, and once connected, the time to deflate the tires took only 176 seconds (aka 2 minutes, and 54 seconds), whereas if the operator performed the same task individually deflating the tires, the time to deflate, and check the pressure of the four tires collectively took a whopping 390 seconds (aka 6 minutes and 30 seconds), a time savings of 55.38 percent.

As to exiting the beach, the setup time again took 90 seconds with the above compressor and specifications thereof, and the time to inflate using the invention 1 took 466 seconds (aka 7 minutes, 46 seconds), whereas if the operator performed the same task individually inflating the tires, the time to inflate, and check the pressure of the four tires collectively took 633 seconds (aka 10 minutes and 33 seconds), a time savings of 30.45 percent. It should be noted that in these illustrations, namely, FIGS. 1A to 3A, each conduit has an inner diameter of about one-quarter inch, and the length of the conduit 152a,b from the manifold 110 to the diverging fitting 160a,b was about 8.5 feet, and to the first connecting means 158a,b about one foot, and then from the diverging fitting 160a,b to the connecting means 168a,b about 10 feet, wherein the lengths and specifications of the conduits 152a,b, 162a,b, were symmetrical on both sides of the vehicle.

It is envisioned that the device 101 may be asymmetrical, such as is the scenario when being used on a vehicle that has more tires on rear, then on the front, such as a dually (aka big dually) which has two tires on the front, and four tires on the rear.

Figure 3A:
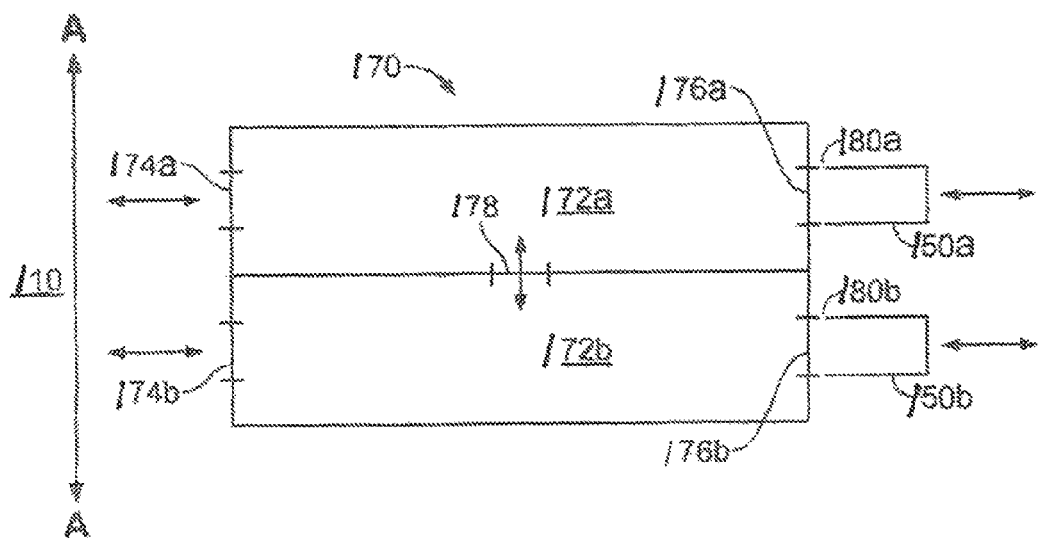
FIG. 3A illustrates a front view of the controlling means of FIG. 1A.
Figure 1B:
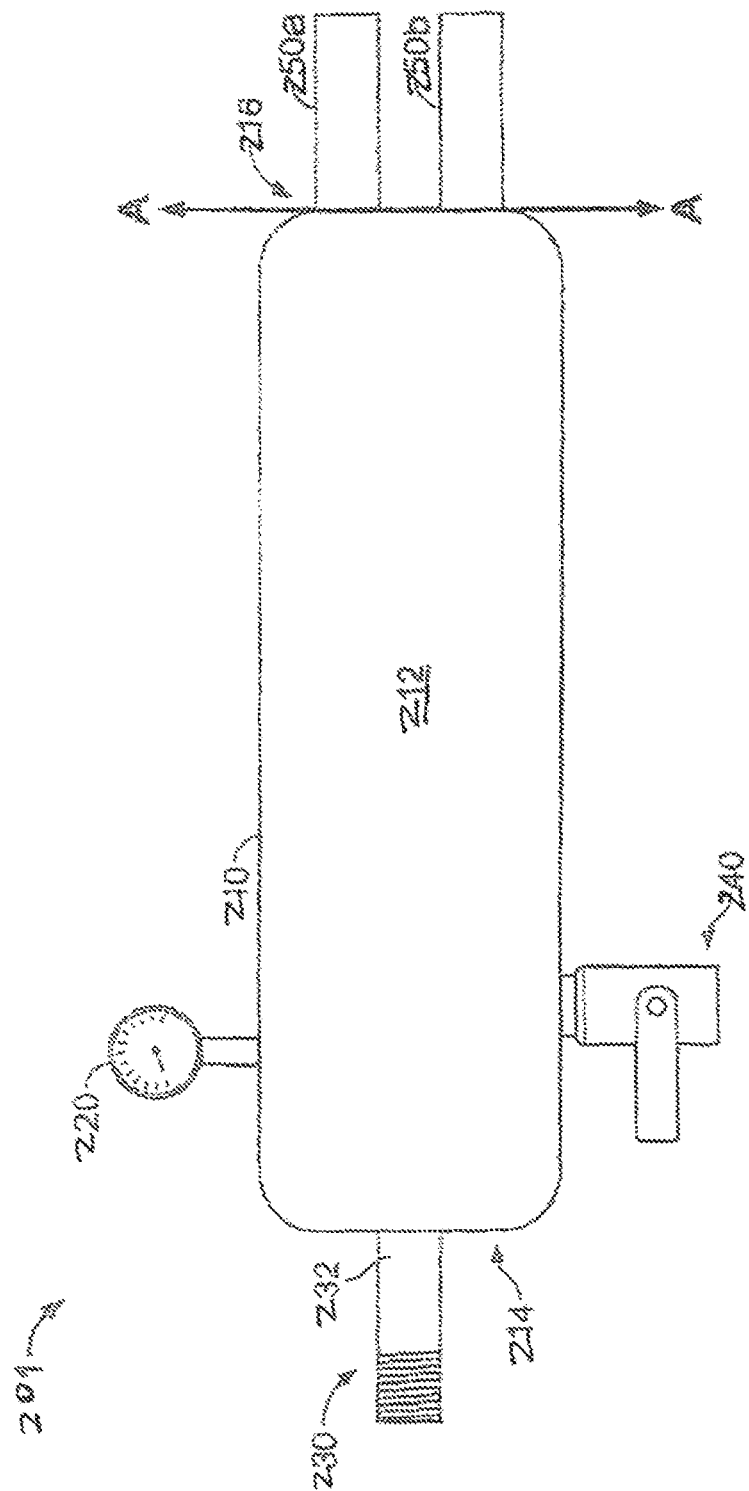
FIG. 1B illustrates a front view of a second alternative embodiment.
Figure 2B:
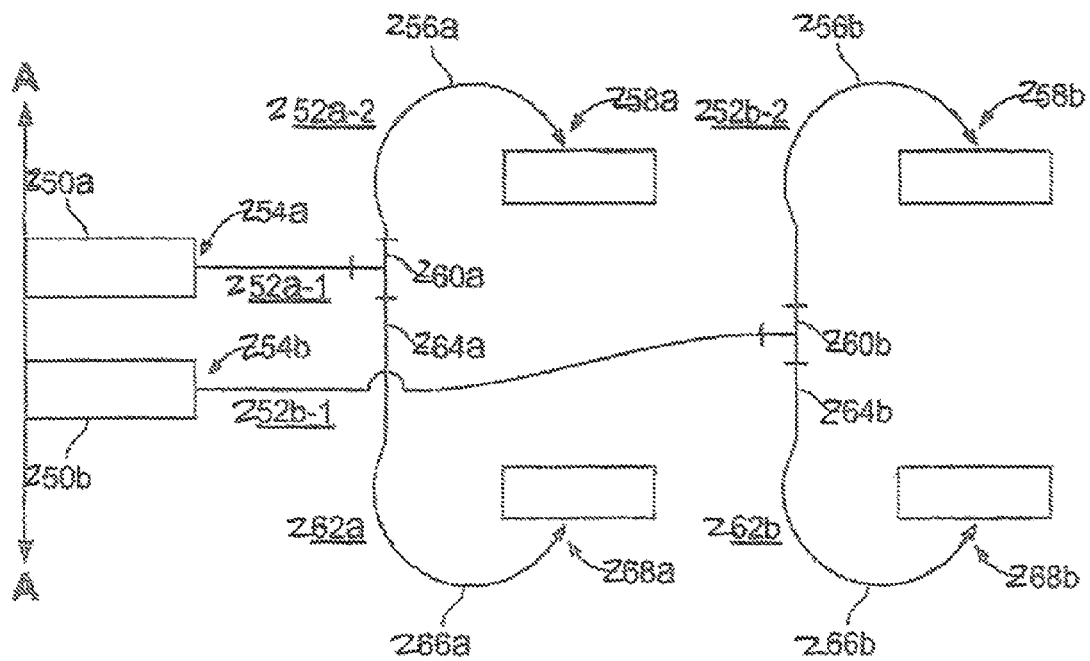
FIG. 2B illustrates a side view of FIG. 1B.

FIG. 3A illustrates an optional controlling means 70 which is included for regulating the air pressure at the air exchange ports 150a,b. The controlling means 170 comprises a bifurcated chamber 172a,b between the manifold 110 and the air exchange ports 150a,b, said chamber 172a,b having a first opening 174a,b on the proximal end, a second opening 176a,b on its distal end, and a third opening 178 between the first and second sub-chambers 172a,b.

The first opening 174a,b is connected to the distal end 116 of the manifold 110 permitting air to enter each sub-chamber 172a,b.

The second opening 174a,b is located on the distal end of each sub-chamber 172a,b, connecting the sub-chamber 172a,b with an air exchange port 150a,b, permitting air to egress, with the conduit 152a,b and the connecting means 158a,b and 168a,b.

The third opening 178 between the two sub-chambers 172a,b provides harmonization of the pressures at the air exchange ports 150a,b, and ultimately the connecting means 158a,b and targeted tires.

Each opening 174a,b, 176a,b, and 178 has a gate that opens and closes which is operated by a controller 180.

The controller 180a on the first port 150a includes at least one set point, preferably two, namely a high and low. The low set point is used when the tire is deflated; the high set point when the tire is inflated.

The controller 180b on the second port 150b includes at least one set point, preferably at least two, a high and a low, and optionally, a sync mode. The low set point is used when the tire is deflated, the high set point when the tire is inflated; and the sync mode when the targeted deflation/inflation set points on the second port 150b are the same as the desired set point on the first port 150a. The sync mode set point enables the user to harmonize the pressure on both ports 150a,b, which typically one port 150a is used for the front tires, and the other port 150b for the rear tires. Driving the vehicle with deflated tires typically requires all the tires having identical pressure of 10 to 15 PSI for the beach, which on road/pavement, some vehicles require a different pressure for the front as compared to the rear, although some operators ignore this and put the same pressure in all the tires regardless whether on or off road. This system 101 provides the best of both worlds, namely, the specification of the vehicle as recommended by the manufacturer but also the operator's personal use for comfort and handling.

FIGS. 1B to 3B illustrate a preferred embodiment of the present invention, which is directed to an air pressure harmonizing system 201. The system 201 has a central manifold 210 having a longitudinally hollow body 212 with a first and second end 214,216, wherein said manifold 210 is made from a material that is corrosion resistant and/or rust resistant, for example, the material used may incorporate plastic, PVC, and/or stainless steel or the like.

The system 201 includes a gauge means 220, positioned between said first and second ends 214,216 extending radially outwardly from said body 212. The gauge means 220 may be an analog, digital, or combination of analog and digital type, wherein an analog type is illustrated in the drawings.

The system 201 further includes an inlet port means 230, positioned near said first end 214 extending axially outwardly from said body 212, wherein said inlet port 230 is configured and dimensioned to removeably receive a standard sized air chuck via a single air source. The inlet port 230 is longitudinally shaped with an outer wall 232, wherein said outer wall 232 is threaded.

The system 201 further includes an outlet port means 240, positioned between said first and second ends 214,216 extending radially outwardly from said body 212, said means 240 being configured and dimensioned to selectively discharge surplus air to a desired target pressure determined by the operator thereof. The outlet port means 240 comprises a ball valve, although it is envisioned that other types of stop cocks or pressure relief valves can be substituted.

The system 201 still further includes a plurality of air exchange ports 250a,b extending axially outwardly from said chamber 210, wherein each air exchange port 250a,b has a flexible conduit 252a,b connected thereto, each conduit 252a,b having a proximal and distal end 254a,b, 256a,b, wherein a connecting means 258a,b is cooperatively connected to said distal end 256a,b of said conduit 252a,b for releaseably connecting to an air valve on the targeted tire. Each air exchange port 250a,b extends axially outwardly, however, it is envisioned that they 250a,b may be either parallel or not depending on the shape of the body 210 and design choice.

Each conduit 252a,b is bifurcated into a first and second length 252a-1, 252a-2 and 252b-1, 252b-2, wherein a diverging fitting 260a,b, such as a t-fitting or y-fitting, is inserted therebetween and wherein a second conduit 262a,b, having a proximal and distal end 264a,b and 266a,b, is cooperatively connected to said fitting 260a,b via the proximal end thereof 264a,b, and said distal end 266a,b having a connecting means 268a,b cooperatively connected thereto for releaseably connecting to an air valve on a targeted tire (not shown). For example, an air chuck, or some other device that attaches to the air valve and remains thereon hands free during the pressure adjustment process, once the process is completed, the device can be removed quite easily.

Each conduit 252a,b and 262a,b is made from a material that is corrosion resistant, such as rubber, and/or plastic but should be able to withstand air pressure of about two-hundred pounds per square inch (200 PSI), or about one-hundred pounds per square in (100 PSI), but no less than about fifty pounds per square inch (50 PSI), as it is envisioned this system can be used on a bicycle, motorcycle, tricycle, quadracycle, an ATV (whether three, four, or six-wheeled), a golf-cart, and/or motor-vehicle having a plurality of tires.

Furthermore, each conduit 252a,b and 262a,b is made from a material that has at least about one-quarter inch inside diameter ID, although larger diameters may be incorporated depending on the specifications of the pump such as its CFM and PSI ratings.

Each connecting means 258a,b and 268a,b is normally closed when not engaged/deployed, and open when engaged/deployed with a valve of the wheel of the desired/target vehicle, thereby permitting the operator to operate the connecting means 258a,b and 268a,b hands free and attend to the system 201 while in use.

In order to illustrate the device in use, the following is an example of deployment thereof on a four wheeled drive vehicle having a tire size of 30×9/50 R 15 LT, using a portable air compressor having the following specifications, 12 volts, max amps 45, max pressure of 140 PSI, and a flow rate of 3.71 CFM @ 90 PSI.

The time to connect all four connecting means 258a,b, and 268a,b to the valves of the vehicle took 90 seconds, and once connected, the time to deflate the tires took only 176 seconds (aka 2 minutes, and 54 seconds), whereas if the operator performed the same task individually deflating the tires, the time to deflate, and check the pressure of the four tires collectively took a whopping 390 seconds (aka 6 minutes and 30 seconds), a time savings of 55.38 percent.

As to exiting the beach, the setup time again took 90 seconds with the above compressor and specifications thereof, and the time to inflate using the invention 1 took 466 seconds (aka 7 minutes, 46 seconds), whereas if the operator performed the same task individually inflating the tires, the time to inflate, and check the pressure of the four tires collectively took 633 seconds (aka 10 minutes and 33 seconds), a time savings of 30.45 percent.

It should be noted that in these illustrations, namely, FIGS. 1B to 3B, each conduit has an inner diameter of about one-quarter inch, and the length of the conduit 252a,b from the manifold 210 to the diverging fitting 260a,b was about 8.5 feet, and to the first connecting means 258a,b about one foot, and then from the diverging fitting 260a,b to the connecting means 268a,b about 10 feet, wherein the lengths and specifications of the conduits 252a,b, 262a,b, were symmetrical on both sides of the vehicle.

It is envisioned that the device 201 may be asymmetrical, such as is the scenario when being used on a vehicle that has more tires on rear, then on the front, such as a dually (aka big dually) which has two tires on the front, and four tires on the rear.

Figure 3B:
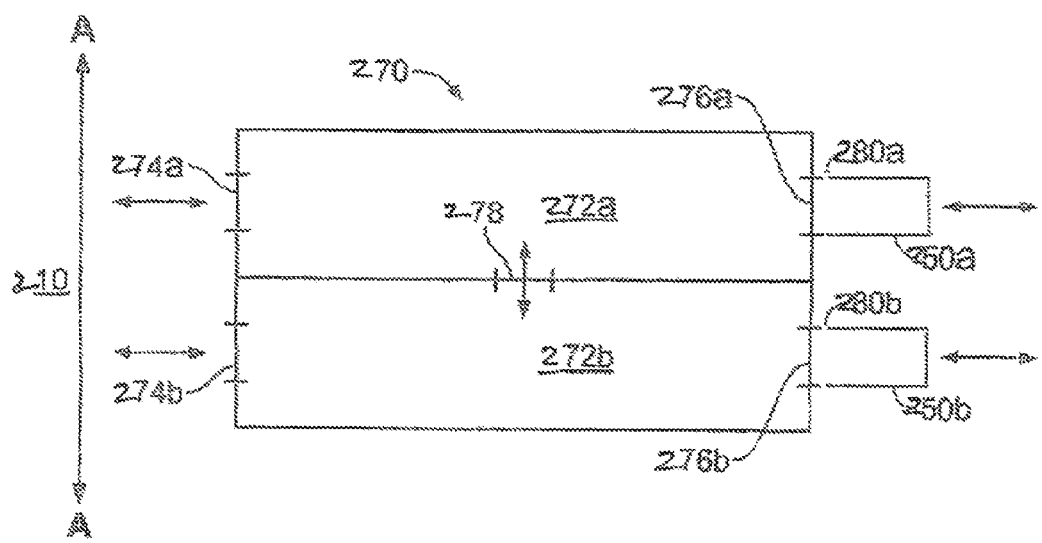
FIG. 3B illustrates a front view of the controlling means of FIG. 1B.

FIG. 3B illustrates an optional controlling means 270 which is included for regulating the air pressure at the air exchange ports 250a,b. The controlling means 270 comprises a bifurcated chamber 272a,b between the manifold 210 and the air exchange ports 250a,b, said chamber 272a,b having a first opening 274a,b on the proximal end, a second opening 276a,b on its distal end, and a third opening 278 between the first and second sub-chambers 272a,b.

The first opening 274a,b is connected to the distal end 216 of the manifold 210 permitting air to enter each sub-chamber 272a,b.

The second opening 274a,b is located on the distal end of each sub-chamber 272a,b, connecting the sub-chamber 272a,b with an air exchange port 250a,b, permitting air to egress, with the conduit 252a,b and the connecting means 258a,b and 268a,b.

The third opening 278 between the two sub-chambers 272a,b provides harmonization of the pressures at the air exchange ports 250a,b, and ultimately the connecting means 258a,b and targeted tires.

Each opening 274a,b, 276a,b, and 278 has a gate that opens and closes which is operated by a controller 280.

The controller 280a on the first port 250a includes at least one set point, preferably two, namely a high and low. The low set point is used when the tire is deflated; the high set point when the tire is inflated.

The controller 280b on the second port 250b includes at least one set point, preferably at least two, a high and a low, and optionally, a sync mode. The low set point is used when the tire is deflated, the high set point when the tire is inflated; and the sync mode when the targeted deflation/inflation set points on the second port 250b are the same as the desired set point on the first port 250a. The sync mode set point enables the user to harmonize the pressure on both ports 250a,b, which typically one port 250a is used for the front tires, and the other port 250b for the rear tires. Driving the vehicle with deflated tires typically requires all the tires having identical pressure of 10 to 15 PSI for the beach, which on road/pavement, some vehicles require a different pressure for the front as compared to the rear, although some operators ignore this and put the same pressure in all the tires regardless whether on or off road. This system 201 provides the best of both worlds, namely, the specification of the vehicle as recommended by the manufacturer but also the operator's personal use for comfort and handling.

All of the above referenced patents; patent applications and publications are hereby incorporated by reference. Many variations of the present invention will suggest themselves to those of ordinary skill in the art in light of the above detailed description. All such obvious modifications are within the full-intended spirit and scope of the claims of the present application.

What is claimed is:

1. An air pressure harmonizing system comprising:
a central manifold, said manifold having a longitudinally hollow body with a first and second end; wherein said manifold is made from a material that is rust resistant;
a gauge means, positioned between said first and second ends extending radially outwardly from said body; wherein said gauge means is selected from the group consisting of analog, digital, and combination thereof;
an inlet port means, positioned between said first and second ends extending radially outwardly from said body, wherein said inlet port being configured and dimensioned to removeably receive a standard sized air chuck via a single air source; wherein said inlet port is longitudinally shaped with an outer wall, wherein said outer wall is threaded;
an outlet port means, positioned between said first and second ends extending radially outwardly from said body, said means being configured and dimensioned to selectively discharge surplus air to desired target pressure; wherein said outlet port means comprises a ball valve;
a plurality of air exchange ports extending axially outwardly from said body, wherein each air exchange port has a flexible conduit connected thereto, each conduit having a proximal and distal end, wherein a connecting means is cooperatively connected to said distal end of said conduit for releasably connecting to an air valve;
a control means for regulating pressure into said air exchange ports from said manifold, said control means comprising a bifurcated chamber between said manifold and said air exchange ports; said bifurcated chamber defining a first and second sub-chambers, each of said sub-chamber s having a first opening on the proximal end, a second opening on its distal end, and a third opening between the first and second sub-chambers; said first opening is connected to the distal end of the manifold permitting air to enter each sub-chamber; the second opening is located on the distal end of each sub-chamber, connecting the sub-chamber with an air exchange port; wherein said third opening between the two sub-chambers provide harmonization of the pressures at the air exchange ports and connecting means; each opening further having a gate that opens and closes by a controller; and wherein said controller provides individual set points for each of the individual air exchange ports, and wherein said controller further includes a plurality of set points.

2. An air pressure harmonizing system comprising:
a central manifold, said manifold having a longitudinally hollow body with a first and second end;
a gauge means, extending radially outwardly from said body;
an inlet port means positioned near said first end, extending axially outwardly from said body; wherein said inlet port being configured and dimensioned to removeably receive a standard sized air chuck via a single air source;
an outlet port means, extending radially outwardly from said body, said means being configured and dimensioned to selectively discharge surplus air to desired target pressure;
and;
a pair of air exchange ports extending axially outwardly from said body, wherein each air exchange port has a flexible conduit connected thereto, each conduit having a proximal and distal end, an inner and outer diameter, wherein a connecting means is cooperatively connected to said distal end of said conduit for releaseably connecting to an air valve; and
a control means for regulating pressure into said air exchange ports from said manifold, said control means comprising a bifurcated chamber between said manifold and said air exchange ports; said bifurcated chamber defining a first and second sub-chambers, each of said sub-chamber s having a first opening on the proximal end, a second opening on its distal end, and a third opening between the first and second sub-chambers; said first opening is connected to the distal end of the manifold permitting air to enter each sub-chamber; the second opening is located on the distal end of each sub-chamber, connecting the sub-chamber with an air exchange port; wherein said third opening between the two sub-chambers provide harmonization of the pressures at the air exchange ports and connecting means; each opening further having a gate that opens and closes by a controller.

3. An air pressure harmonizing system of claim 2, wherein said manifold is made from a material that is corrosion resistant.

4. An air pressure harmonizing system of claim 2, wherein said manifold is made from a material that is plastic.

5. An air pressure harmonizing system of claim 2, wherein said manifold is made from PVC.

6. An air pressure harmonizing system of claim 2, wherein each conduit is bifurcated into a first and second length, wherein a diverging fitting is inserted therebetween and wherein a second conduit, having a proximal and distal end, is cooperatively connected to said fitting via the proximal end thereof, and said distal end having an air chuck cooperatively connected thereto.

7. An air pressure harmonizing system of claim 6, wherein said conduit is made from a material that is corrosion resistant.

8. An air pressure harmonizing system of claim 6, wherein said conduit is made from a material that has at least about one-quarter inch inside diameter.

9. An air pressure harmonizing system of claim 2, wherein each air chuck is normally closed when not engaged, and open when engaged.

10. An air pressure harmonizing system comprising:
a central manifold, said manifold having a longitudinally hollow body with a first and second end;
a gauge means, extending radially outwardly from said body;
an inlet port means, extending radially outwardly from said body; wherein said inlet port being configured and dimensioned to removeably receive a standard sized air chuck via a single air source;
an outlet port means, extending radially outwardly from said body, said means being configured and dimensioned to selectively discharge surplus air to desired target;
a pair of air exchange ports extending radially outwardly from said body, wherein each air exchange port has a flexible conduit connected thereto, each conduit having a proximal and distal end, an inner and outer diameter, wherein a connecting means is cooperatively connected to said distal end of said conduit for releaseably connecting to an air valve;

and;

a control means for regulating pressure into said air exchange ports from said manifold, said control means comprising a bifurcated chamber between said manifold and said air exchange ports; said bifurcated chamber defining a first and second sub-chambers, each of said sub-chamber s having a first opening on the proximal end, a second opening on its distal end, and a third opening between the first and second sub-chambers; said first opening is connected to the distal end of the manifold permitting air to enter each sub-chamber; the second opening is located on the distal end of each sub-chamber, connecting the sub-chamber with an air exchange port; wherein said third opening between the two sub-chambers provide harmonization of the pressures at the air exchange ports and connecting means; each opening further having a gate that opens and closes by a controller; and wherein said controller provides individual set points for each of the individual air exchange ports, and wherein said controller further includes a plurality of set points.

11. An air pressure harmonizing system of claim 10, wherein each conduit is bifurcated into a first and second length, wherein a diverging fitting is inserted therebetween and wherein a second conduit, having a proximal and distal end, is cooperatively connected to said fitting via the proximal end thereof, and said distal end having an air chuck cooperatively connected thereto.

12. An air pressure harmonizing system of claim 11, wherein said conduit is made from a material that is corrosion resistant.

13. An air pressure harmonizing system of claim 10, wherein each air chuck is normally closed when not engaged, and open when engaged.

* * * * *